(12) United States Patent
Roytblat et al.

(10) Patent No.: US 9,990,410 B2
(45) Date of Patent: Jun. 5, 2018

(54) DATA SANITIZATION AND NORMALIZATION AND GEOCODING METHODS

(71) Applicant: ZOOM AND GO, LTD., Toronto (CA)

(72) Inventors: Igal Roytblat, Toronto (CA); Jonathan Haldane, Toronto (CA)

(73) Assignee: ZOOM AND GO LTD., Toronto, ON (CA)

( * ) Notice: Subject to any disclaimer, the term of this patent is extended or adjusted under 35 U.S.C. 154(b) by 236 days.

(21) Appl. No.: 14/911,856

(22) PCT Filed: Aug. 14, 2014

(86) PCT No.: PCT/CA2014/000620
§ 371 (c)(1),
(2) Date: Feb. 12, 2016

(87) PCT Pub. No.: WO2015/021532
PCT Pub. Date: Feb. 19, 2015

(65) Prior Publication Data
US 2016/0203198 A1     Jul. 14, 2016

Related U.S. Application Data

(60) Provisional application No. 61/865,984, filed on Aug. 14, 2013.

(51) Int. Cl.
*G06F 17/00* (2006.01)
*G06F 17/30* (2006.01)
*G09B 29/00* (2006.01)
*G09B 29/10* (2006.01)

(52) U.S. Cl.
CPC .. *G06F 17/30569* (2013.01); *G06F 17/30061* (2013.01); *G06F 17/30241* (2013.01); *G09B 29/006* (2013.01); *G09B 29/007* (2013.01); *G09B 29/106* (2013.01)

(58) Field of Classification Search
CPC ............ G06F 3/04845; G06F 19/3481; G06F 3/0482; G06F 3/04842; G06F 3/04847
See application file for complete search history.

(56) References Cited

U.S. PATENT DOCUMENTS

| | | |
|---|---|---|
| 8,060,582 B2 | 11/2011 | Bliss et al. |
| 8,150,848 B2 | 4/2012 | Gupta et al. |
| 8,650,024 B1 | 2/2014 | Snellman et al. |

OTHER PUBLICATIONS

International Search Report in PCT/CA2014/000620 dated Oct. 8, 2014.
Written Opinion in PCT/CA2014/000620 dated Oct. 8, 2014.

*Primary Examiner* — Truong Vo
(74) *Attorney, Agent, or Firm* — Stephen W. Leonard; Lynn C. Schumacher; Hill & Schumacher

(57) ABSTRACT

Embodiments of the present technology relate to data sanitization and normalization and geocoding methods that apply the same. An example method includes sanitizing geodata sets and normalizing the sanitized geodata using a normalized Levenshtein distance Algorithm.

21 Claims, 7 Drawing Sheets

DATA SANITIZATION AND NORMALIZATION AND GEOCODING METHODS

CROSS REFERENCE TO RELATED APPLICATIONS

This application is a National Phase application claiming the benefit of the International PCT Patent Application No. PCT/CA2014/000620, filed on Aug. 14, 2014, in English, which claims the priority benefit of U.S. Provisional Application Ser. No. 61/865,984, filed on Aug. 14, 2013, titled "Systems and Methods for Geocoding and Correcting Geocoded Data", which are hereby incorporated by reference herein in their entirety, including all references cited therein.

FIELD OF THE PRESENT TECHNOLOGY

The present technology relates generally to geocoding and map creation, and more specifically, but not by way of limitation, to systems and methods that correctly geocode points of interest, where each point of interest is represented by a plurality of discrepant expressions from different databases. The present technology harmonizes these discrepant expressions to increase consistency for these geocoded locations.

SUMMARY

Embodiments of the present technology include a method, comprising: (a) receiving two multi-segment sets of characters, each of the two multi-segment sets of characters comprises a plurality of segments, each of the segments comprising a format; (b) sanitizing each of the two multi-segment sets of characters by: (i) converting a segment of the plurality of segments of a multi-segment set of characters into a standardized format if the format of a segment is not in the standardized format; and (ii) reducing each of the two multi-segment sets of characters by creating a continuous string of characters from converted segments and non-converted segments; and (c) calculating a distance score using sanitized multi-segment sets of characters, the distance score representing a difference between characters of the sanitized multi-segment sets of characters.

Other embodiments of the present technology include a computing device, comprising: (a) a memory for storing executable instructions; and (b) a processor for executing the executable instructions to: (i) receive two multi-segment sets of characters, each of the two multi-segment sets of characters comprises a plurality of segments, each of the segments comprising a format; (ii) sanitize the two multi-segment sets of characters by: (1) converting a segment of the plurality of segments of the multi-segment string into a standardized format if the format of a segment is not in the standardized format; and (2) reducing the two multi-segment sets of characters by creating a continuous string of characters from the plurality of converted segments; (iii) calculating a normalized Levenshtein distance (NLD) for the sanitized multi-segment sets of characters, wherein the normalized Levenshtein distance is calculated by: (A) calculating a Levenshtein distance (LD) for the sanitized multi-segment sets of characters; (B) normalizing the LD using an equation: $NLD=1-(LDexp1-abs\ ([LSexp1]-[LSexp2]))/min\ ([LSexp1], [LSexp2])$, wherein LSexp1 is a length of a first character string of the sanitized multi-segment sets of characters and LSexp2 is a length of a second character string of the sanitized multi-segment sets of characters.

Additional embodiments of the present technology include a method of geocoding that comprises: (a) receiving two multi-segment sets of characters that potentially represent a same point of interest, each of the two multi-segment sets of characters comprises a plurality of segments, each of the segments comprising a format; (b) converting a segment of the plurality of segments of a multi-segment string into a standardized format if the format of a segment is not in the standardized format; (c) reducing each of the two multi-segment sets of characters by creating a continuous string of characters from converted segments and non-converted segments; (d) calculating a distance score using the sanitized multi-segment sets of characters, the distance score representing a difference between characters of the sanitized multi-segment sets of characters; (d) comparing the distance score to a threshold; and (e) identifying, in a database, the sanitized multi-segment sets of characters as representing the same point of interest if the distance score is below the threshold.

DETAILED DESCRIPTION

Figure 1:
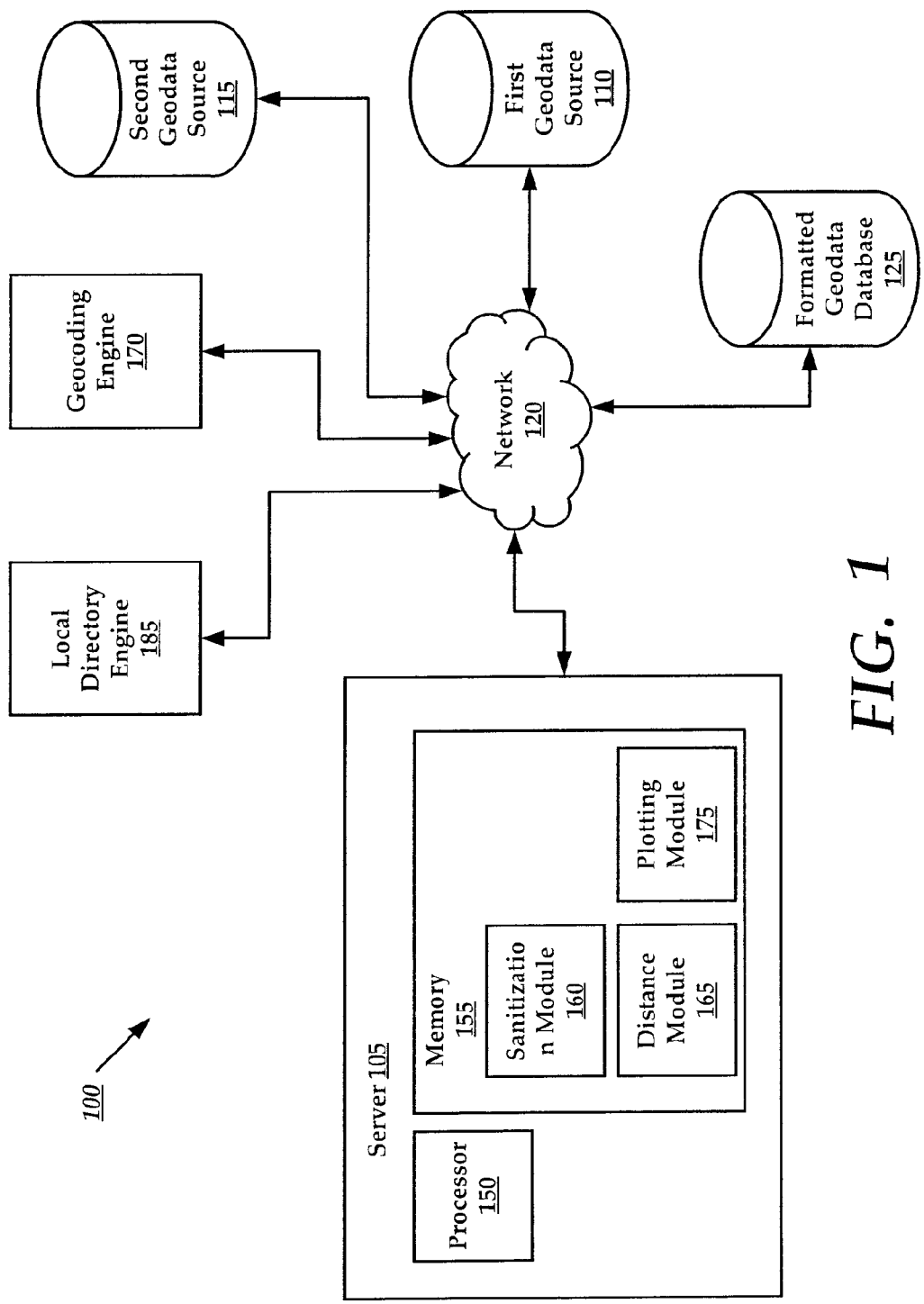
FIG. 1 is a high level schematic diagram of a computing environment for practicing aspects of the present technology.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., "PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Geocoding is often an inaccurate process because source data representative of points of interest can be incorrect and/or lacking in complete information. This errant source data causes points of interest to be plotted incorrectly on a map, which causes deleterious effects for the end user of the map and impacts the trustworthiness of the map provider.

Correct plotting of a point of interest on a map is critical to maintaining consistency and usability of location mapping of features. Empirically, it has been determined that 25% of all points of interest, such as hotels, are incorrectly plotted. For example, these hotels may be placed over a mile away from their correct location. This is due to incomplete, errant, or poorly formatted geolocation data (hereinafter "geodata") for a hotel. Moreover, mapping systems often rely on a plurality of disparate databases that each may use a different format for defining a point of interest. For example, one hotel database may format an address for a hotel as "20 $5^{th}$ Avenue West, New York", while another hotel database may format the address of the exact same hotel as "20 Fifth Ave., W. newyork". While these addresses refer to the same hotel at the same location, the formatting of the addresses can introduce errors when plotting the hotel on a map.

Advantageously, the present technology remedies these deficiencies with geodata sanitation, distance, and normalization processes. It will be understood that while the present technology will be described within the context of geodata, the sanitization and normalization processes described herein can be applied to any data processing methods that require harmonization of data formats. For example, the present technology can be used when input data is susceptible to being provided in a variety of formats, which may lead to errors when the input data is applied.

The present technology improves geocoding processes by identifying points of interest that require verification and reformatting. The present technology uses the geodata formatting methods described herein to match points of interest from unrelated databases and integrate these geodata feeds from unrelated databases with mapping logic to provide superior plotting accuracy. The present technology also accurately plots new points of interest. Thus, some embodiments of the present technology provide improvements in the technical fields of geocoding as well as map creation, and specifically, but not by limitation, to mapping points of interest using geodata that has been sanitized and normalized in accordance with embodiments of the present technology. These and other advantages of the present technology are provided below with reference to the collective drawings (FIGS. 1-7).

FIG. 1 is a high level schematic diagram of a computing architecture (hereinafter architecture 100) of the present technology. The architecture 100 comprises a data sanitization and normalization system (hereinafter "server 105"), a first geodata source 110, a second geodata source 115, network 120, and formatted geodata database 125.

The server 105, the first geodata source 110, and the second geodata source 115 are communicatively coupled with one another over the network 120. The network 120 can include any suitable private or public communications network.

Generally, geodata is received by the server 105 from a plurality of geodata sources, such as the first geodata source 110 and the second geodata source 115. It will be understood that many more geodata sources can also be included. Each of these geodata sources can provide the server 105 with geodata instances that represent various points of interest (POI). For example, the first geodata source 110 and the second geodata source 115 may be travel services databases associated with websites that offer hotel reservations. These geodata sources could also be proprietary hotel databases that are owned by the hotel.

Geodata instances such as geodata instances 110A-N can include any number information fields. For example, geodata can include information fields such as a POI name, street address, city, state, country, zip code, phone number, fax number, website/domain/URL (uniform resource locator), coordinates such as latitude and longitude, as well as combinations of these information fields. Other information fields that would be known to one of ordinary skill in the art are also likewise contemplated for use in accordance with the present technology. In some embodiments, a field of geodata is referred to as a segment. Thus, an instance of geodata can have multiple segments (e.g., multiple fields).

The geodata can be stored in a database as a file, a database entry, a tab delimited file, a comma separate value file, or other similar data structure. As mentioned above, the geodata for the same point of interest from different sources can be discrepant relative to one another. For example, some fields may be formatted differently, such as when a street address is specified in one geodata instance as "$145^{th}$ St." and in another geodata instance as "145 Street". In some instances, geodata fields can be incorrect. For example, a city of a point of interest could be "Palo Alto" when it is, in fact, "Menlo Park". Also, language discrepancies can lead to incorrect geocoding. For example, a street address could be listed as "123 Avenida" in one geodata instance and "123 Avenue" in another. This difference in language can lead to incorrect plotting of the point of interest if the mapping functionality cannot compensate for the language differential.

In some embodiments, geodata obtained by the server 105 is initially processed by determining points of interest (POI) in the geodata. The server 105 will obtain address fields, such as street address, city, state, zip code, and so forth from the geodata obtained from the geodata sources. The server 105 plots the POIs on a map using the address fields.

The server 105 then determines a potential accuracy the POI addresses and also selects any POI addresses that match one another. In some embodiments, the server 105 determines the accuracy of POI addresses by calculating a distance between POI addresses plotted onto the map. The server 105 also considers an initial accuracy rating of the first geodata source 110 and the second geodata source 115. That is, in some instances, the first geodata source 110 and the second geodata source 115 will each provide to the server 105 an accuracy value that represents how accurate the geodata is that the geodata source is providing. In some instances, the server 105 may not rely on the accuracy values provided by the first geodata source 110 and the second geodata source 115 if these accuracy values are determined to be incorrect.

The POI addresses can be verified by comparing them to a coordinate database that includes latitude and longitude information. In some instances, the POI address may include coordinates and these geodata coordinates can be compared to coordinates in the coordinate database to determine accuracy of the POI address. For example, if the POI address is "1234 Main Street" and 37 Latitude and −132 Longitude, the server 105 can look up the coordinates in the coordinate database and compare the POI street address to the coordinates to see if the POI street address substantially corresponds to the coordinates. POI street address and coordinates are substantially corresponding when these two points can be plotted onto a map and the distance therebetween is negligible. For example, a distance is negligible when a user of the map would not be led to an incorrect location using the map. The granularity and closeness of this distance can be determined by the location in some instances. For example, when a POI is located in a densely populated urban area where there are many one-way streets, the distance needs to be smaller to reduce the likelihood that the user will take the wrong street or end up at the wrong location. On the other hand, if the POI is in a sparsely populated area with no adjacent locations that could confuse the end user, the distance can be greater.

In any event, the map system administrator can set a threshold for the distance. If the distance is greater than the threshold, the POI can be flagged as incorrect or in need of recoding by the server 105. That is, the server 105 can ask the geodata source to recode the geodata. Alternatively or additionally, the geodata for the POI could be ignored or deleted by the server 105, in some embodiments.

Figure 2:
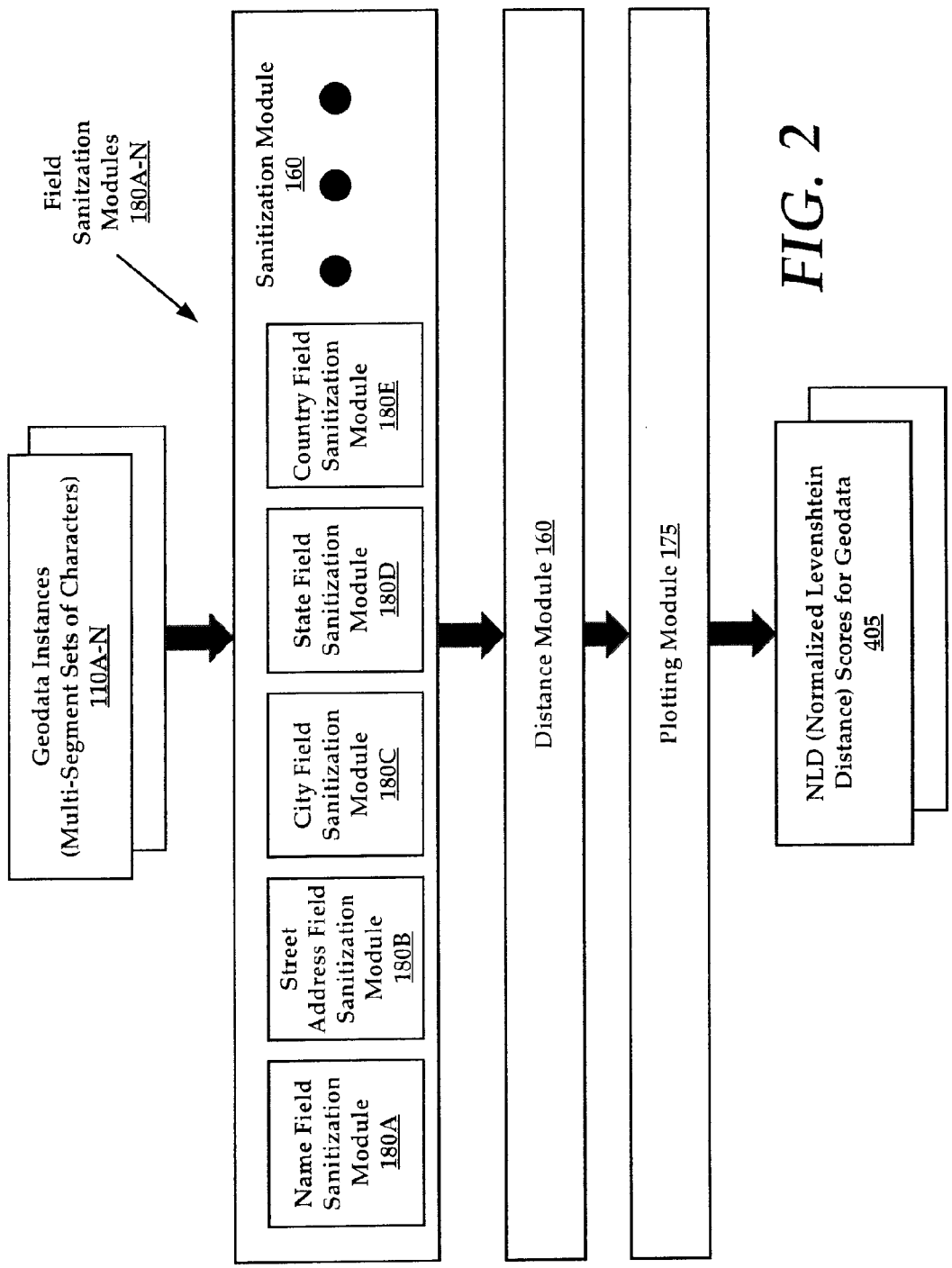
FIG. 2 is a schematic and flow diagram illustrating a geocoding process.

Referring now to FIGS. 1 and 2 collectively, the server 105 is also configured to manage multiple instances of geodata for the same POI. POI duplicates arise when the multiple data sources provide geodata on the same POI. Again, multiple hotel reservation systems can feed their hotel POI geodata to the server 105. In order to present these hotel POI geodata instances on a map, a comparison and/or harmonization is performed by the server 105.

According to some embodiments, the server 105 comprises at least a processor 150 and memory 155. The memory 155 generally includes a sanitization module 160, a distance module 165, and a plotting module 175.

The processor 150 executes the sanitization module 160 that is stored in memory to perform various operations. In one embodiment, the sanitization module 160 is configured to break instances of geodata into fields. It will be understood that an instance of geodata may also be generally referred to as a multi-segment set of characters. For example, an instance of geodata may include "Hotel Mainstreet, 1234 Main St., Anytown, State, USA, 99991, (34, −123)". Again, the geodata may have any format. For example, the geodata can include fields that are arranged in a column or row style list, a set of comma separated values, a tab delimited set of fields, or any other format that would be suitable. The server 105 will break the instance of geodata into separate fields such as Name=Hotel Mainstreet; StreetAddress=1234 Main St.; City=Anytown; State=State; Country=USA; Zipcode=99991; Latitude=34; Longitude=−123.

The sanitization module 160 will, in some embodiments convert all uppercase letters in the instance of geodata into lowercase. Also, the sanitization module 160 will remove all non-alphanumeric characters from the instance of geodata. The removal of the non-alphanumeric characters allows the fields to be concatenated or reduced into a single string of characters.

The sanitization module 160 may then process fields of the instances of geodata with a plurality of special purpose sanitizers such as field sanitizer modules 180A-N. Generally, the sanitization module 160 is configured to convert a segment or field into a standardized format if the format of the segment is not in a standardized format. The following examples of field sanitizer modules 180A-N are used to convert fields into a standard format in order to harmonize discrepant fields of geodata that represent the same POI.

The number of field sanitizer modules 180A-N will depend on the number of fields present in the instances of geodata. Each of the field sanitizer modules 180A-N is configured to sanitize a particular type of geodata field. For example, a name field sanitizer module 180A sanitizes a name field of an instance of geodata. In one example, if the name field does not include either the words "hotel" or "inn", or another similar word such as "motel", the name field sanitizer module 180A will add in the word "hotel" to the name field. Thus, the standardized format for the name field requires the word "hotel" to be present in the name field. A street address field sanitizer module 180B is configured to normalize street fields of instances of geodata. For example, the street address field sanitizer module 180B can perform a substitution of field data such as "Avenida", "Avenue", and "Av" to "aye". Thus, "ave" is the standardized format. In another example, "Four", "Fourth", "4$^{th}$", "IV", "quatre", and "cuatro" are all changed to a standardized format of "4". Thus, for each type of street address data, a standardized format is applied such that many different formats are normalized to the standard.

In one non-limiting example, a first instance of geodata includes a street address field of "20 5$^{th}$ Avenue West, New York", which is converted to "205avewnewyork". Uppercase letters are changed to lowercase letters and non-alphanumeric characters such as spaces and commas are removed. The address fields are then processed to change "5$^{th}$" to "5", "avenue" to "ave", and "west" to "w".

In another example, a second instance of geodata includes a street address field of "20 Fifth Ave., W., newyork", which is converted to "205avewnewyork". Uppercase letters are changed to lowercase letters and non-alphanumeric characters such as spaces and commas are removed. One address field is then processed to change "Fifth" to "5".

In this example the first instance of geodata may come from the first geodata source 110 and the second instance of geodata may come from the second geodata source 115.

The city, state, and country fields can also be sanitized using their respective field normalizer modules in a similar manner. After sanitization/normalization, the sanitized address fields and city fields can be submitted by the server 105 to a geocoding engine 170 that identifies possible matches between instances of geodata. The geocoding engine 170 can be integrated with the server 105 or may in some embodiments comprise one or more third party geocoding engines.

In another example, a sanitized address and city can be submitted to local directory engine 185 such as a virtual white or yellow pages to determine if the sanitized address is associated with a listing in the local directory engine 185.

In one embodiment, the distance module 165 is executed to calculate the Levenshtein distance (LD) between two instances of sanitized geodata. Generally, a Levenshtein distance is calculated between two string sequences. One of ordinary skill in the art will be capable of calculating a LD for a pair of sanitized strings of geodata. In general, the LD is a numerical value that represents how many substitutions to a first string are required to transform the first string to correspond to a second string. The Levenshtein distance has several simple upper and lower bounds. These include: (a) the LD is always at least the difference of the sizes of the two strings; (b) the LD is at most the length of the longer string; (c) the LD is zero if and only if the strings are equal; (d) if the strings are the same size, a Hamming distance is an upper bound on the LD; (e) the LD between two strings is no greater than the sum of their LD from a third string (triangle inequality).

For example, a first sanitized string would include "100avedereublicamadrid", which was sanitized from "100 Avenida de Republica, Madrid" and a second sanitized string is "100republicaavemadrid" that was sanitized from "100 Republica Avenue, Madrid".

A LD between "100 Avenida de Republica, Madrid" and "100 Republica Avenue, Madrid" is 17, meaning that 17 substitutions must be made to "100 Avenida de Republica, Madrid" to arrive at "100 Republica Avenue, Madrid". A LDexp1 can also be calculated for the first and second sanitized strings, which is nine, meaning that nine substitutions must be made to "100avedereublicamadrid" to arrive at "100republicaavemadrid".

It is noteworthy to mention that the distance module 165 compares or matches similar field types from the two geodata instances. For example, the distance module 165 compares a street address field of one geodata instance to a street address field of a second geodata instance. Comparisons between fields with no consideration of field type may lead to poor comparative results by the distance module 165.

The distance module 165 normalizes the LDexp1 value by first determining a length of the first sanitized string, which is 22 and a length of the second sanitized string, which is 21.

After determining these length values, the distance module 165 calculates a normalized LD (NLD) value using the following equation:

$$NLD = 1 - (LDexp1 - abs([LSexp1] - [LSexp2]))/\min([LDexp1], [LSexp2])$$ [Equation 1]

where LSexp1 is a length of the first character string of the sanitized multi-segment sets of characters, LSexp2 is a length of the second character string of the sanitized multi-segment sets of characters, and LDexp1 is the LD calculated for the sanitized pair. The output of the distance module 165 is NLD scores for each of pair of instances of geodata that are compared by the distance module 165.

In detail, the distance module 165 subtracts the length of the second character string from the length of the first character string and divides this value by a minimum value of the LDexp1 and the length of the second character string. An absolute value of the resultant value above is obtained and subtracted from one. The absolute value is then subtracted from the LDexp1. The distance module 165 then multiplies this final number by 100 to obtain the NLD. In the example above, the NLD of the first and second sanitized character strings is 61.9%.

In some embodiments, the distance module 165 may calculate NLD values for various permutations of segments/fields of geodata instances. Continuing with the example above, a permutation (change in order of words) of the address fields would include "100 de Reublica Ave, Madrid" and "100 Republica Ave, Madrid". The sanitized versions would be "100dereublicaavemadrid" and "100republicaavemadrid". A NLD value of 90.1% is calculated for this pair of geodata instances using Equation 1. Many different types of permutations can be performed by rearrangement of fields extracted from the geodata instances. In one embodiment, the distance module 165 can execute a pairwise alignment of matching words between the geodata instances. The pairwise alignment functions to reduce the LD calculated for the resultant sanitized strings of characters. The distance module 165 can also calculate a NLD value for every possible permutation of fields of the geodata instances and determine a highest ranking NLD value.

Again, the permutation process can occur at the field or segment level, such that sub-parts of a field are rearranged. For example, "100 Ave de Reublica, Madrid" can be rearranged to "100 de Reublica Ave, Madrid" or "100 Reublica de Ave, Madrid".

An example flowchart of a process for creating and using permutations of segments/fields of geodata instances is illustrated and described in greater detail below with reference to FIG. 6.

In some embodiments, the distance module 165 can apply NLD thresholds that determine when a NLD is too large to consider the first and second sanitized character strings as corresponding to the same POI. For example, the NLD threshold may be 80%. Thus, any NLD that is lower than 80% will indicate that the geodata instances are potentially not representative of the same POI. While the geodata instances may indeed represent the same POI if the NLD is lower than 80%, the geodata instances may require map plotting or human verification in order to make a final determination. The instances of geodata from which the first and second sanitized character strings were obtained can be flagged for further review. Also, the server 105 can alert the respective geodata sources that their data may be errant in either format and/or content. The NLD threshold can be set to any sensitivity desired.

While the above examples contemplate the use of an 80% NLD threshold, it will be understood that the NLD threshold is merely an example and the NLD threshold can be set to any desired value such that the end users of the system can set a desired sensitivity level for comparing geodata instances.

In another example, a NLD is calculated for a first sanitized character string of "sheratonhotel" and a second sanitized character string of "sheratonhoteldowntowntoronto". In this example, even though the LD is 15, indicating that the strings are not at all similar to one another, the NLD is calculated to be 100%, which indicates that the sanitized strings are identical and each represent the same POI. Even though the LD indicates a large distance discrepancy between the first and second strings, the NLD equation essentially ignores the extra characters in the second string when taking the minimum value of the first and second strings, using Equation 1.

Thus, the present technology provides advantages over the use of a common LD calculation, by using a normalized LD that can be used for a variety of purposes, namely identifying character strings that would normally be considered highly discrepant (e.g., a large distance) as being representative of the same content. In one example, the content includes geodata, but other content includes any type of data that is represented by multiple fields (e.g., segments).

In some embodiments, the distance module 165 can perform a physical distance check between the two sanitized addresses if the NLD is less than 80%. For example, the distance module 165 can cooperate with the plotting module 175 to determine a physical distance between the two points. The plotting module 175 will plot the first sanitized address on a map and the second sanitized distance on the map. The distance module 165 can calculate a physical distance between the first and second sanitized addresses. For example, the distance module 165 can calculate a geographical distances between the two plotted points on the map.

Because the physical distance is less than 100 feet, the distance module 165 will consider the first and second sanitized addresses as being representative of the same POI, even if the NLD is below the threshold. Returning to the example above, the first sanitized string of "100avedereublicamadrid" and the second sanitized string of "100republicaavemadrid", when plotted on the map, reveal a physical distance of zero. Thus, even though the NLD (61.9%) was slightly below the threshold of 80%, the sanitized addresses were indeed representative of the same POI.

Figure 3:
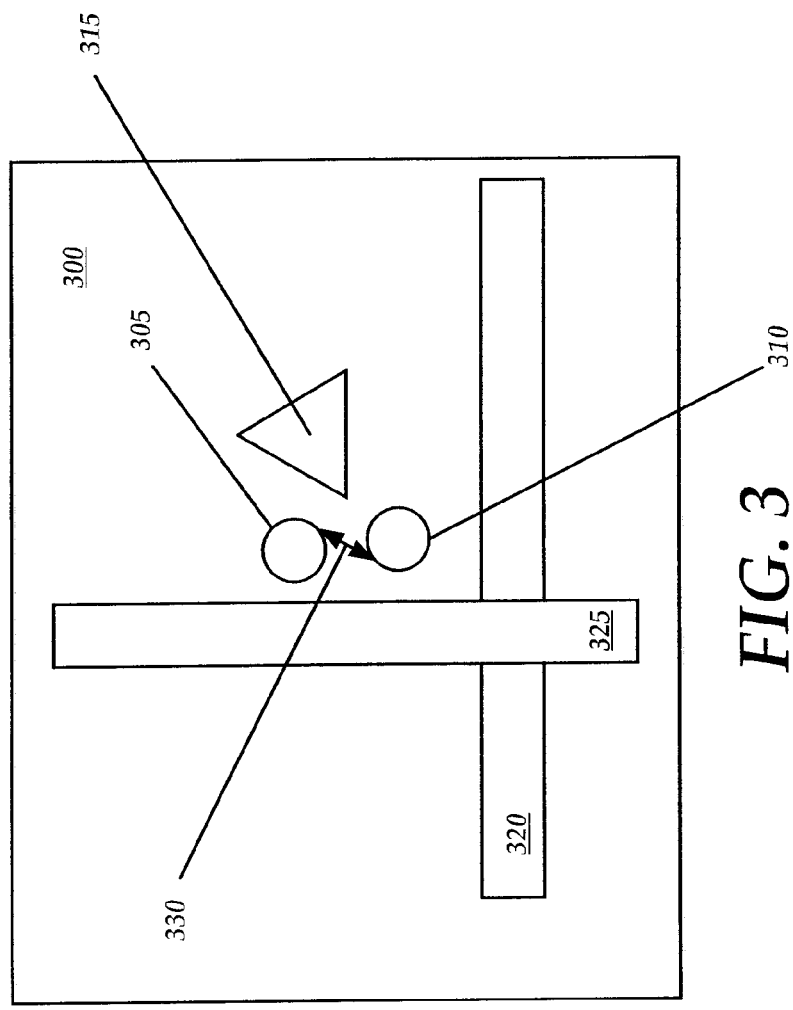
FIG. 3 is a perspective view of a map that illustrates a process of physical distance calculation between two geocoded points that represent the same physical point of interest.

Referring to FIG. 3, the first sanitized address is plotted as point 305 on map 300. The second sanitized address is plotted as point 310 on map 300. The actual point of interest is a hotel 315 that is located at the intersection of two streets 320 and 325. A distance 330 between the first and second points 305 and 310 can be calculated (or estimated) by determining coordinates for each of the points 305 and 310. In one embodiment, the coordinates can be determined if the map 300 includes coordinates. When the points are overlaid on the map 300, the coordinates can be estimated.

Again, since the distance 330 is essentially zero, it is determined that the points 305 and 310 describe the same POI, which corresponds to the hotel 315. Also, the server 105 can compare the name fields or other fields of the geodata instances to confirm the correspondence between the first and second points.

Figure 4:
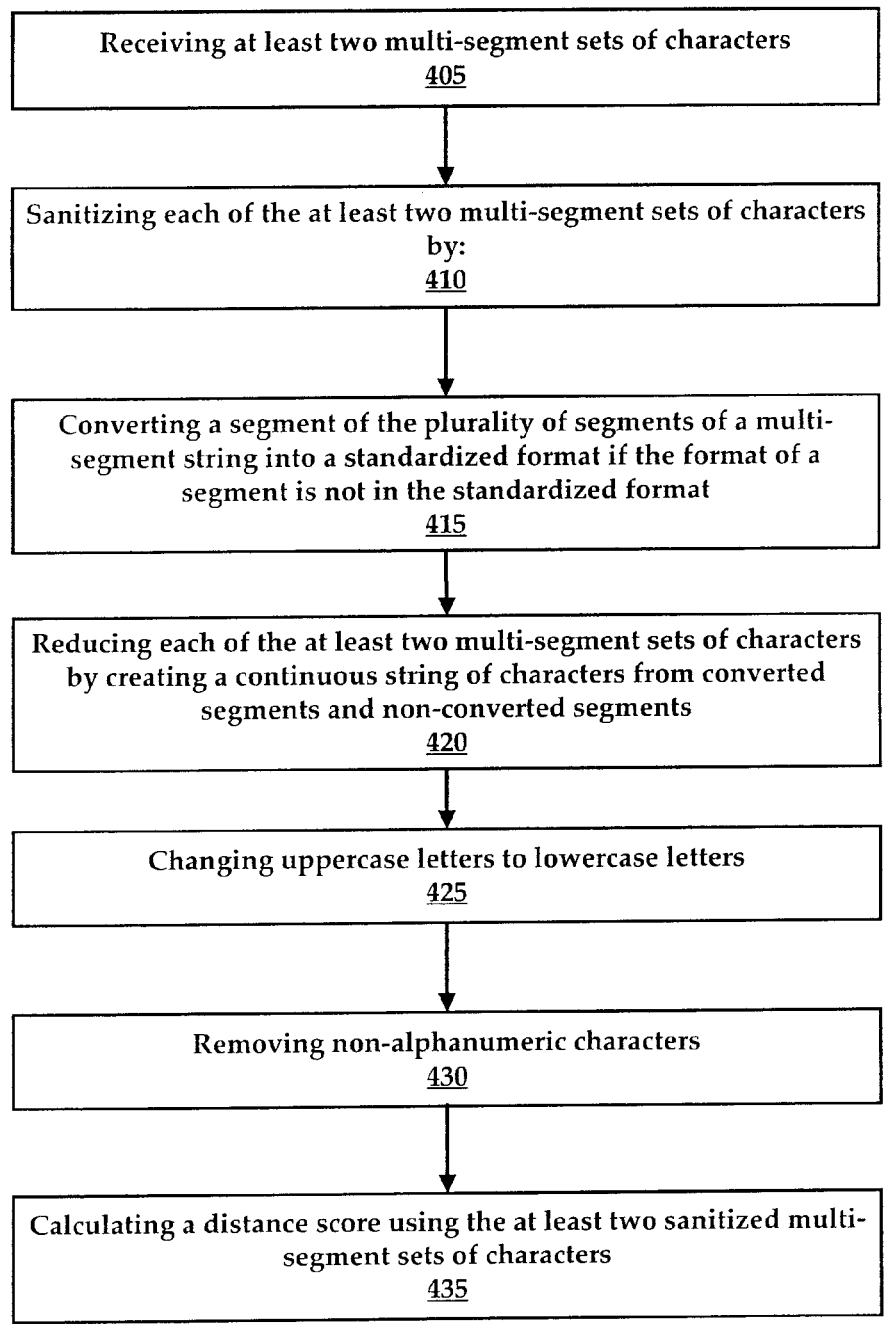
FIG. 4 is a flowchart of a method of the present technology.

FIG. 4 is a flowchart of an example method of the present technology. The method includes receiving 405 two multi-segment sets of characters (e.g., instances of geodata). It will be understood that each of the two multi-segment sets of characters two multi-segment sets of characters comprises a plurality of segments or fields. Also, each of the fields comprises a format. For example, POI name, city, street address, state, and so forth.

The method includes sanitizing 410 each of the two multi-segment sets of characters by first converting 415 a segment of the plurality of segments of a multi-segment string into a standardized format if the format of a segment is not in the standardized format. The conversion may occur for each segment that is not in a standardized format. For example, a standardized format of "5" may be applied to fields such as "fifth", "5$^{th}$", "V" and so forth. Each field can be sanitized, if needed.

Next, sanitization includes reducing 420 each of the two multi-segment sets of characters by creating a continuous string of characters from converted segments and non-converted segments. That is, some segments/fields may not need to be sanitized. The server 105 will combine both the converted and non-converted segments into a single character string. The reduction process can include changing 425 uppercase letters to lowercase letters as well as removing 430 non-alphanumeric characters.

Next, the method includes calculating 435 a distance score using the sanitized multi-segment sets of characters. It will be understood that the distance score represents a difference between characters of the sanitized multi-segment sets of characters. An example method for calculating a distance score is illustrated and described in FIG. 5.

Figure 5:
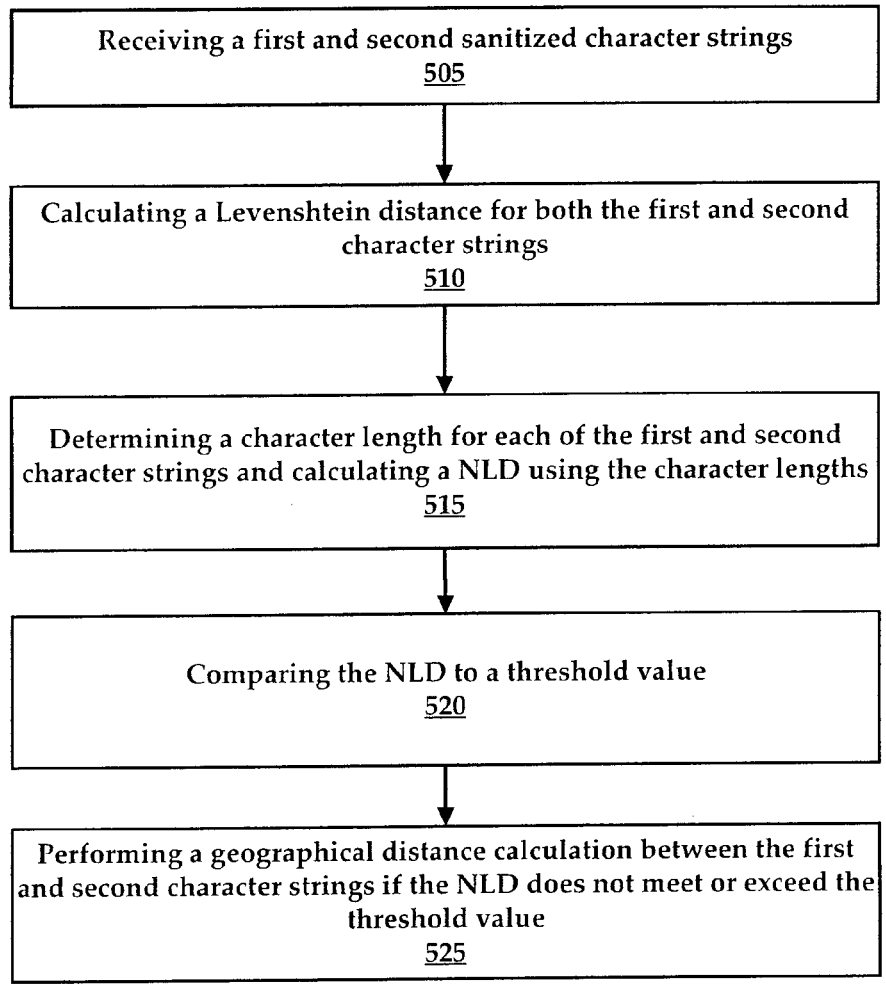
FIG. 5 is a flowchart of a method for performing a normalized Levenshtein distance calculation, and physical distance calculation.

Referring to FIG. 5, a method for calculating a normalized Levenshtein distance (NLD) is illustrated. The method includes receiving 505 a first and second sanitized character strings (e.g., sanitized character strings). In some embodiments, the method includes calculating 510 a Levenshtein distance for both the first and second character strings. The method further comprises determining 515 a character length for each of the first and second character strings and calculating a NLD using the character lengths. The NLD can be calculated using the Equation 1 described in greater detail above.

As mentioned above, the NLD is a percentage score that represents the "closeness" of the characters strings in terms of character content. For example, the NLD of "1234mainst" and "1234mainst" is 100%, whereas the NLD of "100avedereublicamadrid" and "100republicaavemadrid" is 61.9%.

The method further includes comparing 520 the NLD to a threshold value and performing 525 a physical distance calculation between the first and second character strings if the NLD does not meet or exceed the threshold value. For example, the NLD of 61.9% may be compared to a threshold value of 80%. Since the NLD does not meet the threshold, the server 105 can perform the physical distance calculation.

For example, the server can plot first and second character strings onto a map, and more specifically, plotting the street addresses of the first and second character strings. In other embodiments, if the first and second character strings include coordinates, the first and second character strings can be plotted using the coordinates. A distance between the plotted points can be determined and compared to a distance threshold. For example, if the distance is less than 100 feet, the plotted points can be considered to be representative of the same POI.

The flowcharts of FIGS. 4 and 5 can include fewer or additional steps than those described in the flowcharts. Additionally, method steps of the flowcharts can be substituted in accordance with descriptions and examples provided herein.

Figure 6:
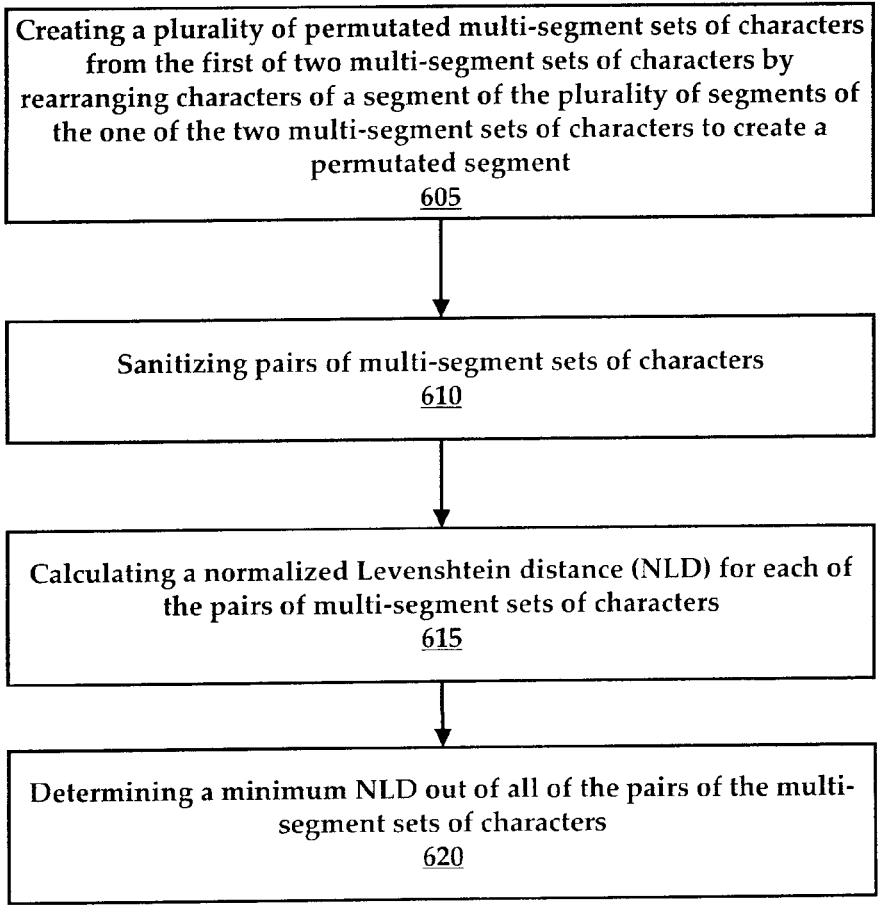
FIG. 6 is a flowchart of a method for creating and using permutations of segments/fields of geodata instances.

FIG. 6 is a flowchart of a method for creating and using permutations of segments/fields of geodata instances, as well as calculating and comparing NLD values generated for pairs of geodata instances. As mentioned above, the example below will reference a geodata instance as a "multi-segment set of characters".

Initially, a first of two multi-segment sets of characters is selected. The second of the two multi-segment sets of characters may remain unchanged. After selection of the first of the two multi-segment sets of characters, the method comprises creating 605 a plurality of permutated multi-segment sets of characters from the first of the two multi-segment sets of characters. This process includes rearranging characters of a segment of the plurality of segments of the one of the two multi-segment sets of characters to create a permutated segment. The rearrangement process occurs numerous times for the first multi-segment set of characters to create the plurality of permutated multi-segment sets of characters.

Next, the method includes creating pairs of multi-segment sets of characters. These pairs include one of the plurality of permutated multi-segment sets of characters and the second of the two multi-segment sets of characters. For example, a first pair would include a multi-segment set of characters "Hotel California, Los Angeles downtown" and a second multi-segment set of characters "Los Angeles California hotel". In a second pairing, a permutated multi-segment set of characters "California Hotel Los Angeles downtown" is paired with the second multi-segment set of characters "Los Angeles California hotel". In a third pairing, another permutated multi-segment set of characters "Los Angeles California Hotel downtown" is paired with the second multi-segment set of characters "Los Angeles California hotel".

Next, the method includes sanitizing 610 pairs of multi-segment sets of characters. Again, the pairs of multi-segment sets of characters comprise various combinations of the plurality of permutated multi-segment sets and a second of the two multi-segment sets of characters as described above.

In one embodiment, the method includes calculating 615 a normalized Levenshtein distance (NLD) for each of the pairs of multi-segment sets of characters.

In some embodiments, the method includes determining a highest ranking NLD of all the pairs of the multi-segment sets of characters.

In another embodiment, the method includes determining 620 a minimum NLD out of all of the pairs of the multi-segment sets of characters. The pair with the minimum NLD is considered to be the best matched pair of the geocoded instances (e.g., pairs of multi-segment sets of characters).

Figure 7:
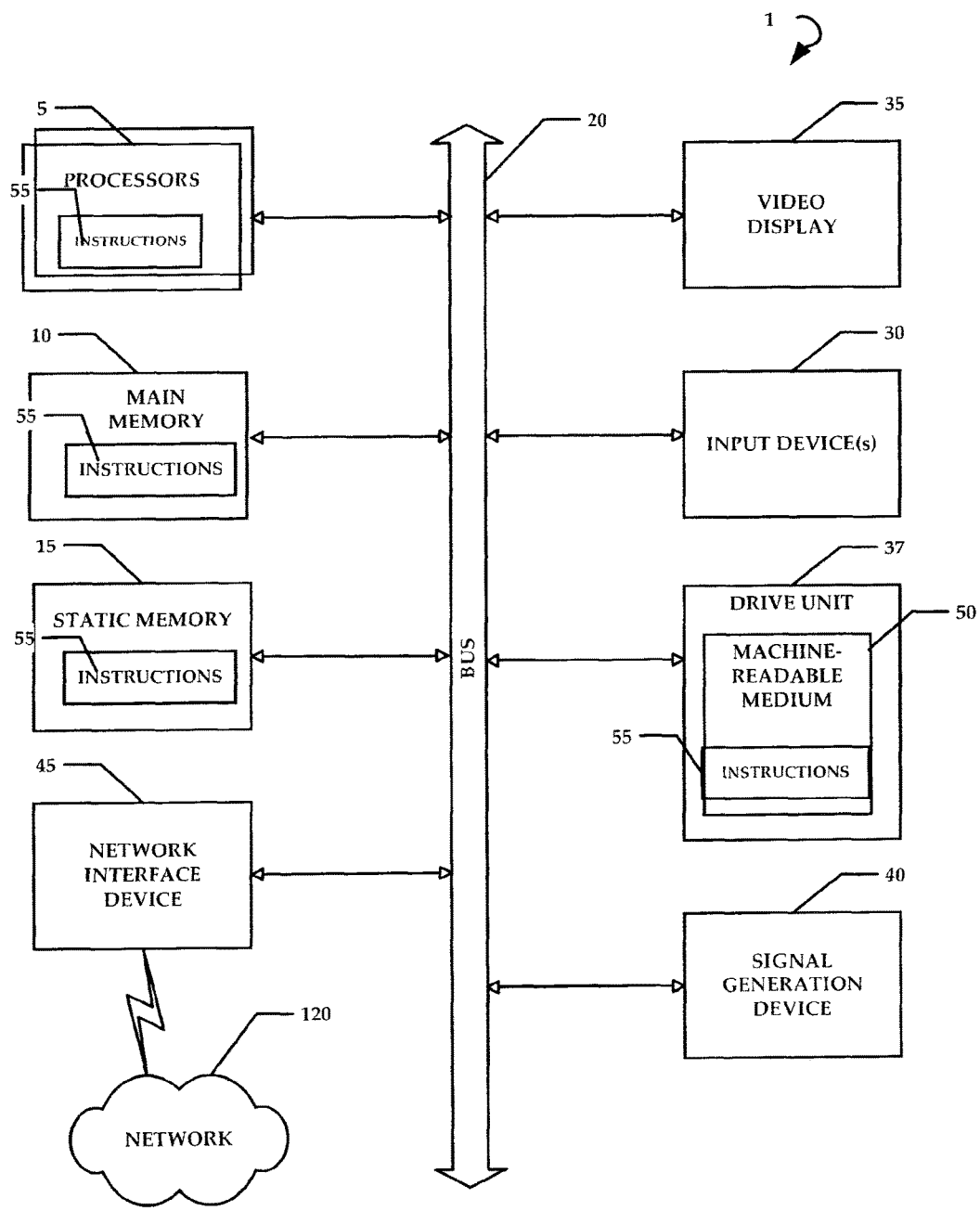
FIG. 7 is a schematic diagram of a computing system that is used to implement embodiments according to the present technology.

FIG. 7 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a portable music player (e.g., a portable hard drive audio device such as an Moving Picture Experts Group Audio Layer 3 ((MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alpha-numeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The disk drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network 140 (see FIG. 2) via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps in a different order, and some processes or steps may be deleted, moved, added, subdivided, combined, and/or modified to provide alternative or sub-combinations. Each of these processes or steps may be implemented in a variety of different ways. Also, while processes or steps are at times shown as being performed in series, these processes or steps may instead be performed in parallel, or may be performed at different times.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method executed by a computing device, the computing device comprising a processor and memory for storing executable instructions, the processor executing the instructions to perform the method, the method comprising:
   receiving two multi-segment sets of characters, each of the two multi-segment sets of characters comprises a plurality of segments, each of the segments comprising a format;
   sanitizing each of the two multi-segment sets of characters by:
      converting a segment of the plurality of segments of a multi-segment set of characters into a standardized format if the format of a segment is not in the standardized format; and
      reducing each of the two multi-segment sets of characters by creating a continuous string of characters from converted segments and non-converted segments; and
   calculating a distance score using sanitized multi-segment sets of characters, the distance score representing a difference between characters of the sanitized multi-segment sets of characters.

2. The method according to claim 1, wherein sanitizing further comprises removing non-alphanumeric characters from the plurality of segments.

3. The method according to claim 1, wherein sanitizing further comprises converting upper case characters to lower case characters for each of the plurality of segments.

4. The method according to claim 1, wherein at least one of the plurality of segments is in a first language and at least one of the plurality of segments is in a second language.

5. The method according to claim 1, wherein calculating the distance score comprises calculating a Levenshtein distance (LDexp1) for the sanitized multi-segment sets of characters.

6. The method according to claim 5, wherein calculating the distance score comprises calculating a normalized Levenshtein distance (NLD) for the sanitized multi-segment sets of characters, wherein the normalized Levenshtein distance is calculated using the equation:

$$NLD=1-(LDexp1-abs([LSexp1]-[LSexp2]))/\min([LDexp1],[LSexp2]),$$

wherein LSexp1 is a length of a first character string of the sanitized multi-segment sets of characters, LSexp2 is a length of a second character string of the sanitized multi-segment sets of characters, and LDexp1 is the LD for the sanitized multi-segment sets of characters.

7. The method according to claim 6, further comprising converting the NLD to a percentage score.

8. The method according to claim 1, further comprising:
creating a plurality of permutated multi-segment sets of characters from a first of the two multi-segment sets of characters by:
rearranging characters of a segment of the plurality of segments of the one of the two multi-segment sets of characters to create a permutated segment;
sanitizing pairs of multi-segment sets of characters, wherein the pairs of multi-segment sets of characters comprise various combinations of the plurality of permutated multi-segment sets and a second of the two multi-segment sets of characters;
calculating a normalized Levenshtein distance (NLD) for each of the pairs of multi-segment sets of characters.

9. A computing device, comprising:
a memory for storing executable instructions; and
a processor for executing the executable instructions to:
receive two multi-segment sets of characters, each of the two multi-segment sets of characters comprises a plurality of segments, each of the segments comprising a format;
sanitize the two multi-segment sets of characters by:
converting a segment of the plurality of segments of a multi-segment of characters into a standardized format if the format of a segment is not in the standardized format; and
reducing the two multi-segment sets of characters by creating a continuous string of characters from the plurality of converted segments;
calculating a normalized Levenshtein distance (NLD) for the sanitized multi-segment sets of characters, wherein the normalized Levenshtein distance is calculated by:
calculating a Levenshtein distance (LDexp1) for the sanitized multi-segment sets of characters;
normalizing the LDexp1 using an equation:

$$NLD=1-(LDexp1-abs([LSexp1]-[LSexp2]))/\min([LDexp1],[LSexp2]),$$

wherein LSexp1 is a length of a first character string of the sanitized multi-segment sets of characters, LSexp2 is a length of a second character string of the sanitized multi-segment sets of characters, and LDexp1 is the LD for the sanitized multi-segment sets of characters.

10. The computing device according to claim 9, wherein the processor further executes the instructions to sanitize by removing non-alphanumeric characters from each of the plurality of segments.

11. The computing device according to claim 9, wherein the processor further executes the instructions to sanitize by converting upper case characters to lower case characters for each of the plurality of segments.

12. The computing device according to claim 9, further comprising converting the NLD to a percentage score.

13. The computing device according to claim 9, wherein each of the two multi-segment sets of characters represents a point of interest on a map.

14. The computing device according to claim 9, further comprising:
plotting each of the two multi-segment sets of characters onto a map as points of interest;
calculating a physical distance between the plots; and
identifying the two multi-segment sets of characters as representing a same point of interest if the physical distance is below a distance threshold.

15. A geocoding method executed by a computing device, the computing device comprising a processor and memory for storing executable instructions, the processor executing the instructions to perform the method, the method comprising:
receiving two geodata strings of characters that potentially represent a same point of interest, each of the two geodata strings comprising a plurality of segments, each of the segments comprising a format;
converting a segment of the plurality of segments of a geodata string into a standardized format if the format of a segment is not in the standardized format;
reducing each of the two geodata strings of characters by creating a continuous string of characters from the plurality of converted segments;
calculating a distance score using the sanitized multi-segment sets of characters, the distance score representing a difference between characters of the two reduced and sanitized geodata segment strings of characters;
comparing the distance score to a threshold; and
identifying, in a database, the two reduced and sanitized geodata strings of characters as representing the same point of interest if the distance score is below the threshold.

16. The method according to claim 15, wherein the plurality of segments comprise any of POI name, city, street address, state, country, zipcode, phone number, fax number, website URL, coordinates, and combinations thereof.

17. The method according to claim 15, further comprising:
plotting each of the geodata strings of characters onto a map as points of interest;
calculating a geographical distance between the plots; and
identifying the two geodata strings of characters as representing a same point of interest if the geographical distance is below a distance threshold.

18. The method according to claim 15, wherein sanitizing further comprises removing non-alphanumeric characters from the plurality of segments.

19. The method according to claim 15, wherein sanitizing further comprises converting upper case characters to lower case characters for each of the plurality of segments.

20. The method according to claim 15, wherein at least one of the plurality of segments is in a first language and at least one of the plurality of segments is in a second language.

21. The method according to claim 15, further comprising plotting a point of interest on a map, the point of interest being defined by the sanitized geodata segment strings of characters, if the sanitized geodata segment strings of characters are determined to represent a same point of interest.

* * * * *